No. 626,158. Patented May 30, 1899.
P. C. & A. J. GIBBONS.
DEVICE FOR OPENING OR CLOSING GATES.
(Application filed Jan. 7, 1899.)
(No Model.)
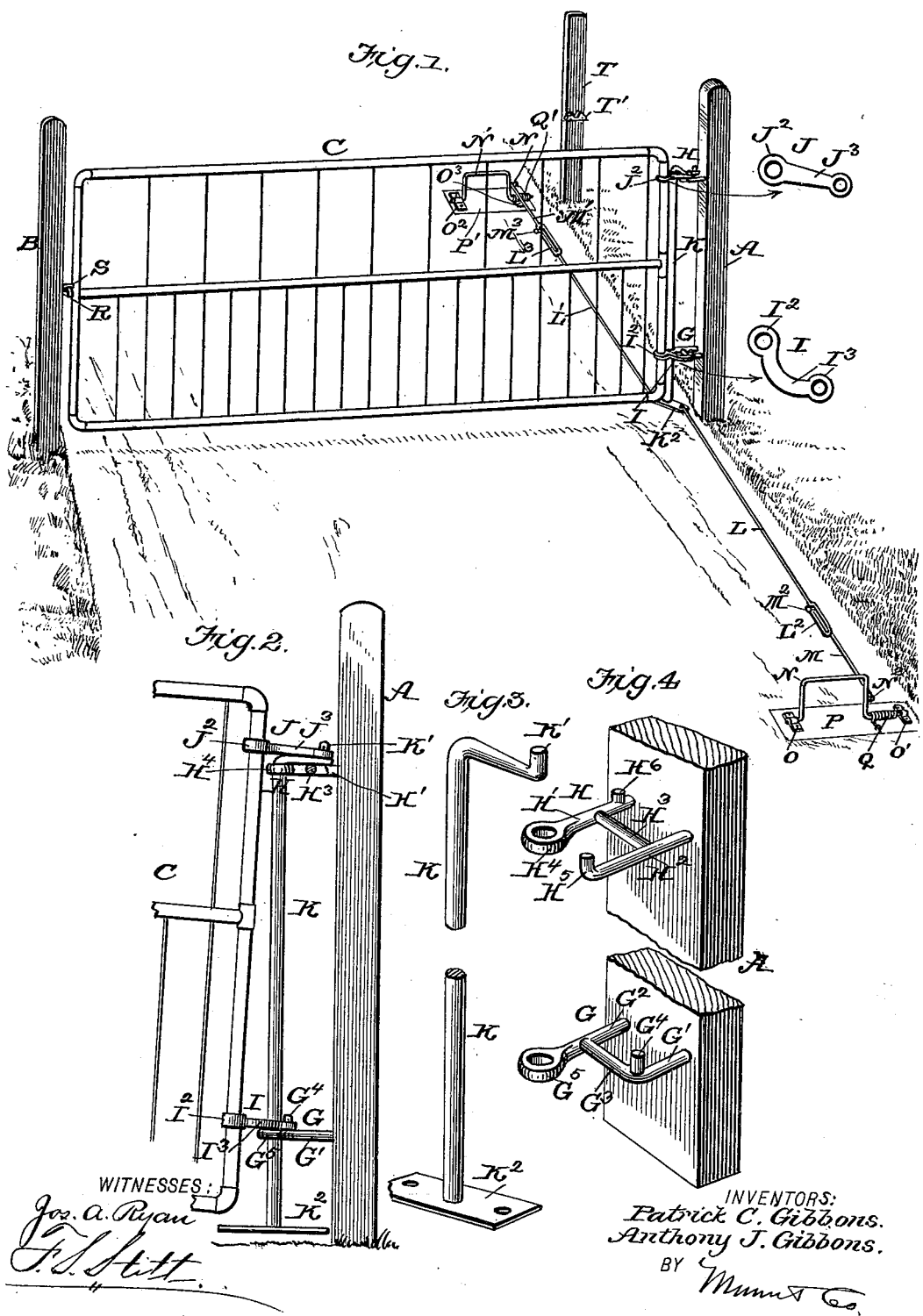
WITNESSES:
Jos. A. Ryan
F. S. Hitt
INVENTORS:
Patrick C. Gibbons.
Anthony J. Gibbons.
BY Munn & Co.
ATTORNEYS.

UNITED STATES PATENT OFFICE.

PATRICK C. GIBBONS AND ANTHONY J. GIBBONS, OF EDINA, MISSOURI.

DEVICE FOR OPENING OR CLOSING GATES.

SPECIFICATION forming part of Letters Patent No. 626,158, dated May 30, 1899.

Application filed January 7, 1899. Serial No. 701,537. (No model.)

*To all whom it may concern:*

Be it known that we, PATRICK C. GIBBONS and ANTHONY J. GIBBONS, of Edina, in the county of Knox and State of Missouri, have invented a new and useful Improvement in Devices for Opening and Closing Gates, of which the following is a specification.

Our invention relates to certain improvements in gates, and particularly to devices for opening and closing the same, the said devices being capable of effective operation at a distance from the gate and being of few and simple parts.

The invention consists, primarily, in peculiarly-constructed hinges, on which the gate is mounted to swing so that the free end of the gate may be tilted upward, whereby to cause the gate to swing open and then subsequently swing back into closed position.

The invention also consists in certain details of construction and combination of the parts, which we shall first describe and then point out in the appended claims.

Reference is to be had to the accompanying drawings, forming part of this specification, in which like characters of reference indicate corresponding parts in all the views.

Figure 1 is a perspective view of a gate hinged in accordance with our invention. Fig. 2 is a broken-away side elevation illustrating the gate raised. Fig. 3 is a detail perspective view of the lever, and Fig. 4 is a similar view of the hinge-brackets.

On the gate-post A are secured an upper bracket H and lower bracket G. The bracket H, as shown in detail in Fig. 4, consists of two spaced-apart and parallel arms H' and H², connected by a cross-bar H³, the said arms being adapted to be secured at one end in the gate-post A and being formed at their opposite ends one with an eye H⁴ and the other with an upward extension H⁵. The arm H' is further provided, near the end which is adapted for insertion in the post, with an upward extension H⁶, adapted for the same purpose as the before-mentioned extension H⁵, which purpose will be hereinafter set forth.

As shown in detail in Fig. 4, the lower bracket G is also formed of two spaced-apart and parallel arms G' G², the arm G' stopping at the cross-bar G³, by which the arms are connected, and provided at its outer end with an upward extension G⁴; but the arm G² is extended beyond such cross-bar and is formed with an eye G⁵ in its outer end.

Upon the brackets described above the gate C is adapted to swing and is pivotally mounted on said brackets by the following devices: A curved hinge I is secured to the inner side of the gate, near the lower end thereof, and the said hinge consists of a clip or band I², attached directly to the gate, and a curved finger I³, extending from said clip and formed with an opening in its free end, by which it is designed to be pivotally held on the upward extension G⁴ of the lower bracket. Instead of being hinged directly to the upper bracket the gate at its upper and inner side is provided with a hinge J, consisting of a clip or band J² and an approximately straight finger J³, formed with an opening in its free end, by which it is adapted to be pivotally held on an upward extension K' on the upper horizontally-bent end of the movable lever K, which latter in turn is held to turn about a vertical axis by having its longer and vertical member inserted through the eye H⁴ of the upper bracket and through the eye G⁵ of the lower bracket.

To turn the lever K, we secure a foot K² to it at its lower end, as shown, the said foot extending beyond the lever equally on both sides of the same, and two oppositely-extending rods L and L' are pivotally secured by a pin or any other suitable means one to each end of the foot K². These rods extend some distance away from the gate and its post on each side and are formed at their outer ends with elongated slots L² and L³, respectively, in which work pins M² and M³ on the ends of short arms M and M', the other ends of the arms being fitted on knobs N² and N³ on one side member of wheel-irons N and N'. The wheel-irons are formed with short angular ends, forming pintles, which are held in straps O O' O² O³, secured to opposite sides of platforms P P', and the said irons, while being capable of being turned about such pintles in either direction, are brought normally to a vertical position, as shown in Fig. 1, by torsional springs Q Q', encircling the pintles at O' and O³, respectively.

At its free end the gate may be provided with a latch R, adapted to be held by a keeper S on the post B when in a closed position, and may be also held by a latch T on a post T'' when in an open position.

In practical operation, the parts being in the position illustrated by Fig. 1, the wheel of a vehicle approaching the gate will be directed to pass over the wheel-iron N, throwing it down toward the gate and causing the pin of the short arm $M^2$ to move forward in the slot $L^2$ and push the rod L' forward. This operation, it will be seen, will turn the foot $K^3$ and cause the lever K to turn, moving the horizontal arm toward the right, and thereby causing the upper end of the gate to move toward the gate-post A and the outer end of the gate to tilt upwardly, becoming free from its latch and swinging outwardly until it comes in contact with the post T'. The vehicle passing through the gate comes to the other wheel-iron N', and the wheel, passing over such wheel-iron, will throw it downwardly away from the gate. This movement of the said wheel-iron will pull on the rod L', causing an opposite movement of the lever and its concomitant parts, whereupon the gate will be swung back until it is closed. The extensions $H^5$ and $H^6$ act as stops to the horizontal arm of the lever K.

It is manifest that by placing the wheel-irons a sufficient distance from the gate the latter can be opened by either wheel-iron.

Having thus described our invention, what we claim as new, and desire to secure by Letters Patent, is—

1. In a device of the character described, the upper and lower brackets arranged for attachment to the gate-post and each consisting of two spaced-apart and parallel arms one of which is formed with an eye and the other with an upward extension, a lever mounted to turn in the said eyes and provided with a horizontally-bent end, upper and lower hinges arranged for attachment to a gate, the upper hinge being held on the horizontal end of the lever, and the lower hinge being mounted on the upward extension of the lower bracket and means for turning said lever, as and for the purpose set forth.

2. The combination with the gate-post, of upper and lower brackets secured thereto, the upper bracket being formed with an eye and the lower bracket having an eye and an upward extension, a lever mounted to turn in said eyes and having a horizontally-bent upper end, a gate provided with upper and lower hinges, the lower hinge being mounted on the upward extension of the lower bracket, and the upper hinge being held on the outer end of the said horizontal end of the lever, a foot secured to the lower end of said lever and extending therefrom in opposite directions, and oppositely-extending rods attached one to each end of said foot, the said rods being arranged for operation by a vehicle-wheel, as and for the purpose set forth.

3. The combination with a gate-post, of a bracket held on said post and formed of two arms one of which is provided with an eye, a second bracket below the first-named bracket and also formed of two arms one of which is provided with an eye, a lever mounted to rotate in said eyes and having a horizontally-bent upper end, a gate provided with an upper hinge held on the said end and a lower hinge mounted to turn about a fixed pivot on the other arm of the lower bracket, means for turning said lever whereby to carry the upper end of the gate inward, and a stop on each arm of the upper bracket arranged for engagement with the horizontal end of the lever to limit the movement of the lever in either direction, as set forth.

PATRICK C. GIBBONS.
ANTHONY J. GIBBONS.

Witnesses:
J. W. ELLIS,
P. K. GIBBONS.